United States Patent [19]
Lechtenberg

[11] 3,766,629
[45] Oct. 23, 1973

[54] MANUFACTURE OF FOAM AIR FILTER ELEMENTS

[75] Inventor: Leo J. Lechtenberg, Elm Grove, Wis.

[73] Assignee: Briggs & Stratton Corporation, Wauwatosa, Wis.

[22] Filed: Nov. 17, 1971

[21] Appl. No.: 199,666

[52] U.S. Cl............................ 29/412, 55/500, 83/621
[51] Int. Cl............................................... B23p 17/00
[58] Field of Search................. 29/412, 415, 157 R; 83/621; 55/498, 500, 521, 522

[56] References Cited
UNITED STATES PATENTS

| 3,290,870 | 12/1966 | Jensen | 55/498 |
| 1,685,678 | 9/1928 | Mirfield | 29/157 |
| 3,059,312 | 10/1962 | Jamieson | 55/522 |
| 3,212,242 | 10/1965 | Florine | 55/522 |
| 3,180,010 | 4/1965 | Malkasian | 55/522 |

FOREIGN PATENTS OR APPLICATIONS

| 1,387,618 | 12/1964 | France | 55/500 |

Primary Examiner—Lowell A. Larson
Attorney—Ira Milton Jones

[57] ABSTRACT

A sleeve-like primary air filter element is cut from a block of resilient foam material, such as polyurethane. In relaxed condition the sleeve has a narrow, elongated race track shape, with straight side stretches that are parallel and slightly spaced apart flatwise, and portions curved on small radius that connect the ends of the straight stretches. It is slipped axially around a cylindrical secondary filter medium of corrugated paper, its resilience permitting ready deformation to ring shape.

3 Claims, 3 Drawing Figures

PATENTED OCT 23 1973 3,766,629

MANUFACTURE OF FOAM AIR FILTER ELEMENTS

This invention relates to the manufacture of air filters such as are used for cleaning the air inducted into the carburetor of an internal combustion engine, and the invention is more particularly concerned with a method of manufacturing a resilient plastic foam sleeve that can serve as a filter element in such an air cleaner.

Polyurethane foam filter elements are finding widespread use as components of carburetor intake air cleaners for internal combustion engines. In the type of air cleaner with which the present invention is concerned, a polyurethane foam element is incorporated in the form of a sleeve that surrounds another filter element such as a corrugated paper filter. The polyurethane foam sleeve serves as a primary filter medium that collects the larger dirt particles in air passing through it, but its pores are large enough to pass an adequate air flow even after it has trapped a substantial amount of dirt; hence the foam sleeve affords a considerably longer service life for the filter element in which it is incorporated than would be available from a filter consisting only of a corrugated paper medium.

The foam sleeve provides further advantages that result from its spongy, resilient compressibility. It can be accommodated satisfactorily in metal air cleaner housings of a range of sizes and thus makes it possible to manufacture air cleaners cheaply without the need for maintaining close tolerances. Furthermore, the air cleaner can be so arranged that edge portions of the foam sleeve can be compressed to serve as sealing gaskets. In some cases it is possible to take advantage of the fact that polyurethane foam is not adversely affected by soap and detergent solutions, and to utilize it in a more or less permanent filter element that can be cleaned and reused by the consumer.

Heretofore, polyurethane foam air cleaner sleeves have sometimes been formed by a molding operation. This was a relatively expensive procedure, since it required an investment in a substantial number of individual molds in order to achieve any significant production volume, and it also required some degree of individual handling of the molds and molded parts. Furthermore, a nonporous crust is formed on the surface of a molded polyurethane foam part, and this crust had to be skived off of at least those surfaces of the filter element through which air had to pass. Removal of the crusts was of course costly in time, labor and wasted polyurethane material.

Another method heretofore employed in the manufacture of sleeve-like polyurethane foam filter elements has been to cut straight strips of the foam material and glue or cement the opposite ends of each strip to one another to form it into a sleeve. While inexpensive, such cemented sleeves were undesirable, and a one-piece sleeve is considered to be much more satisfactory. However, cutting annular cylindrical sleeves out of a foam block is expensive because a plug-like circular central portion has to be cut out of each sleeve and must be discarded.

With the foregoing considerations in mind it is the general object of the present invention to provide a method of manufacturing polyurethane sleeve filter elements of the character described that enables such elements to be made very cheaply and with very little waste of polyurethane.

Another object of this invention is to provide a method of cutting filter element sleeves from a block of polyurethane foam or similar cellular and porous resilient plastic material, which method can be practiced with the use of simple punch dies, requires the crust to be skived off of only two surfaces of the block of material, and produced only very small plugs of material to be discarded.

With these observations and objectives in mind, the manner in which the invention achieves its purpose will be appreciated from the following description and the accompanying drawing, which exemplify the invention, it being understood that changes may be made in the precise method of practicing the invention and in the specific apparatus disclosed herein without departing from the essentials of the invention set forth in the appended claims.

The accompanying drawing illustrates one complete example of an embodiment of the invention constructed according to the best mode so far devised for the practical application of the principles thereof, and in which.

Referring now more particularly to the accompanying drawing, the numeral 5 designates generally a polyurethane foam filter element which is made by the method of this invention and which can serve as a sleeve that surrounds another filter medium.

Figure 1:
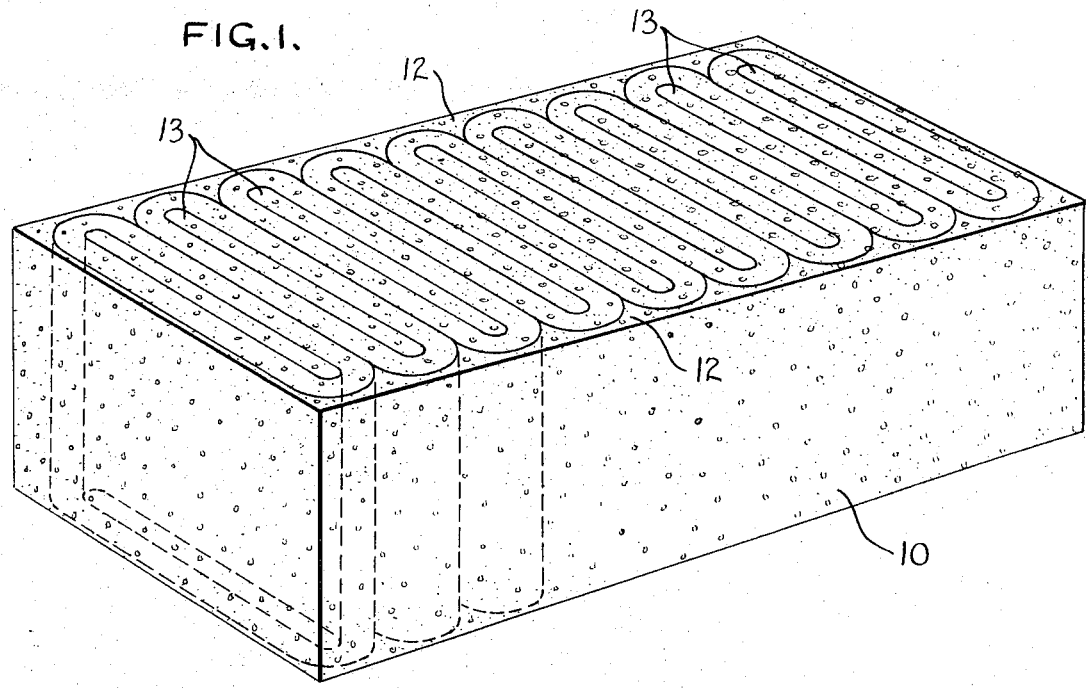
FIG. 1 illustrates a block of resilient foam material and the cuts that are made therein to form sleeve-like filter elements in accordance with the method of this invention.
Figure 2:
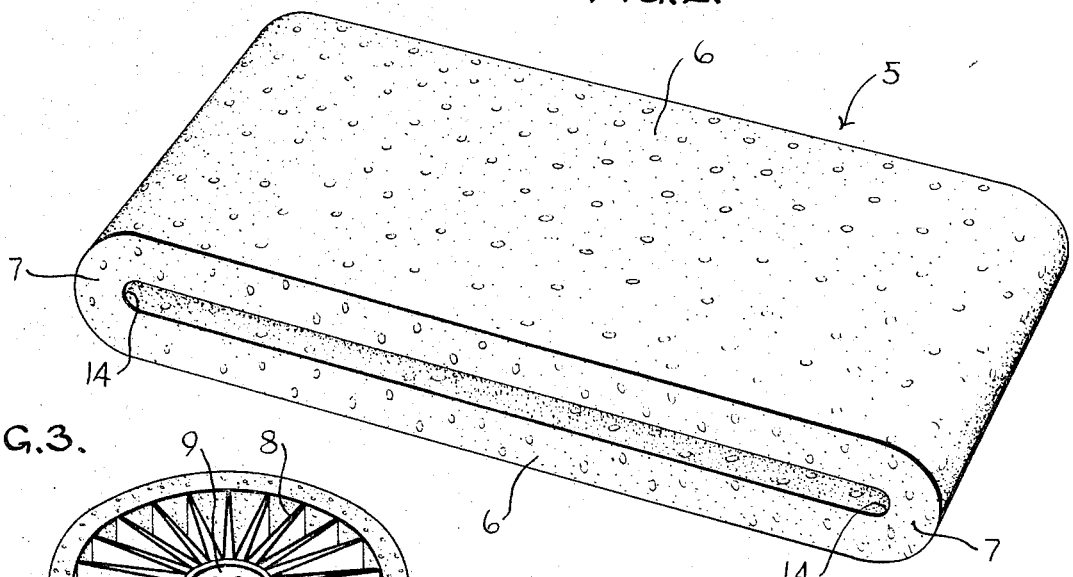
FIG. 2 is a perspective view of one of the filter elements made by the method, shown in relaxed condition.

In its relaxed condition, as shown in FIG. 2, the filter element 5 has the shape of an endless band, with a pair of relatively long straight stretches 6 that are in closely adjacent flatwise parallel relationship, and with end portions 7 that connect the end portions of the straight stretches and are curved on a relatively small radius. Thus in end view the relaxed filter sleeve has a very narrow elongated race-track shape.

Figure 3:
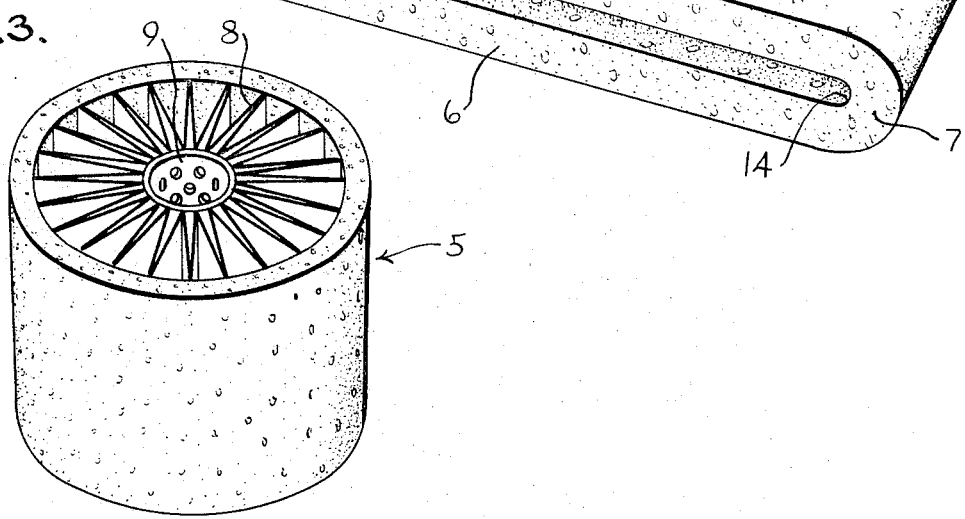
FIG. 3 is a perspective view of a polyurethane foam filter sleeve made by the method of this invention, incorporated in an air filter that also comprises a corrugated paper filter medium.

Because of the soft resiliency of the polyurethane foam material of which the filter sleeve is made, it can be very readily deformed from its relaxed condition to a cylindrical annular shape, as shown in FIG. 3, by simply slipping it axially over a more rigid inner member or core portion of cylindrical shape. In FIG. 3 the inner member is shown as comprising a generally conventional corrugated or pleated paper filter element 8 which in turn surrounds a generally tubular metal supporting member 9 with a foraminous wall. The tubular member 9 may of course comprise a part of a conventional air cleaner housing structure.

According to this invention, the filter sleeve 5 is cut from a relatively large block or billet 10 of polyurethane foam. Initially, the block 10 is molded with a height slightly greater than the axial dimension of the filter sleeve, so that the nonporous crusts can be skived off of its top and bottom surfaces. The width of the block is preferably very slightly greater than the overall length of the relaxed sleeve, as measured along its major axis, and the length of the block can be sufficient to permit a substantially large member of sleeves to be cut from it.

Sleeves are cut from the blank with the use of male and female cutting dies of a general type conventionally used for cutting polyurethane foam. However, the dies are of course so shaped as to provide the cut out sleeves with the narrow race-track configuration above described. All of the sleeves made from one block can be cut from it simultaneously with properly shaped cutting dies. Note that the cut that defines each flat outer surface of a straight stretch of a sleeve also defines a corresponding surface on the next adjacent sleeve cut from the block, so that the only material of the block that is wasted are edge portions 12 cut away from the rounded ends of the row of sleeves and a long narrow plug 13 cut out of the center of each sleeve. This is far less than would be wasted if cylindrical sleeves were cut from the block.

Since the inner surface of the sleeve is rounded at its ends, as at 14, no stress raiser is produced that can encourage cracking or tearing of the cellular material at the ends of the relaxed sleeve if the sleeve material is stretched in bringing the sleeve to its cylindrical form. If the opposite straight stretches 6 were merely defined from one another by a slit, instead of by the narrow plug 13, such tearing would tend to start at the ends of the slit.

From the foregoing description taken with the accompanying drawing it will be apparent that this invention provides a quick, easy and inexpensive method of making polyurethane foam filter sleeves for carburetor intake air cleaners and the like.

Those skilled in the art will appreciate that the invention can be embodied in forms other than as herein disclosed for purposes of illustration.

The invention is defined by the following claims:

I claim:

1. The method of making an air filter which comprises:

cutting from a block of resilient plastic foam material a sleeve in the form of an endless band having a pair of substantially long straight stretches that are connected with one another at their ends by curved portions which have concentric interior and exterior surfaces of small radius and which tend to hold said flat stretches parallel and spaced apart flatwise but close together when the sleeve is in relaxed condition so that the sleeve can be cut from the block of material with very little waste thereof.

2. The method of claim 1, further comprising:

deforming the sleeve to a substantially annular shape; and slipping it axially around the periphery of a cylindrical filter of corrugated paper.

3. The method of forming a plurality of annular filter sleeves from a substantially rectangular block of resilient plastic foam material, with very little waste of the material, which method comprises:

die cutting the block to form each sleeve in the shape of an endless band having a pair of straight, flat stretches that are connected at their ends by small radius curved portions of the band, said curved portions having concentric interior and exterior surfaces and disposing said stretches spaced apart flatwise but close together and parallel to one another when the sleeve is in relaxed condition, but said sleeve, by reason of the resilience of its material, being readily deformable to a ring shape.

* * * * *